3,166,582
3-AMINO-2,4 BIS SULFONYL-CROTONONITRILES
AND PRODUCTION THEREOF
Rudolph A. Carboni and John R. Roland, Wilmington,
Del., assignors to E. I. du Pont de Nemours and Company, Wilmington, Del., a corporation of Delaware
No Drawing. Filed July 24, 1961, Ser. No. 125,940
9 Claims. (Cl. 260—465)

The present invention is concerned with a new class of organic chemical compounds which are useful as dye intermediates and a process for the preparation of the novel compounds.

In dye chemistry it is desirable to have available a class of chemically related compounds which by variation within the class can provide a broad range of colors. Such a class has the advantage that a single dyeing technique is usually applicable to all members of the class because of the basic chemical similarity of the members. Thus, a whole family of colors may be applied with a minimum of process variations. This invention concerns a new class of dye intermediates, all of which react readily with 2-chloro-3-cyanomaleimide to give dyes.

The new compounds of this invention are the 3-amino-2,4-bis-sulfonylcrotononitriles (i.e., the 2-amino-1-cyano-propen-1,3-ylene sulfones). These compounds are prepared by the base-catalyzed dimerization of the corresponding sulfonylacetonitriles (i.e., cyanomethyl sulfones) wherein the base employed, in excess of that required to neutralize any free acid present, is in a ratio between 0.001 and 1.0 mole of base per mole of sulfonylacetonitrile.

The products of this invention may be represented by the formula

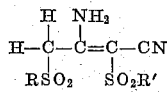

wherein R and R' are radicals attached to the sulfone group by a bond stemming from a carbon atom. R and R' may thus be any monovalent hydrocarbon or substituted hydrocarbon radical with its bond stemming from a carbon atom. There is no organic radical so composed which is known to be incapable of serving as R or R' to form an isolatable 3-amino-2,4-bis-sulfonylcrotononitrile of the above formula.

The 4-(alkali metal) derivatives of the 3-amino-2,4-bis-sulfonylcrotononitriles all react readily with 2-chloro-3-cyanomaleimide to form dyes of the formula

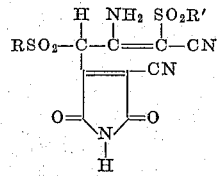

The sulfonylacetonitrile starting materials (RSO$_2$CH$_2$CN)

for the process of this invention are readily prepared by the known reaction of an alkali metal sulfinate (RSO$_2$M) where M is an alkali metal such as sodium or potassium with chloroacetonitrile. Sulfinic acids have been widely studied, and the known variations of R in RSO$_2$H and RSO$_2$M compounds is extremely large. The corresponding sulfonylacetonitriles available according to the above reaction with chloroacetonitrile are all operable in the present invention.

In the above formula for 3-amino-2,4-bis-sulfonyl-crotononitriles, the groups preferred for R and R', because of their ready availability through the synthetic routes discussed above, include alkyl, including monoolefinically unsaturated alkyl (free of aliphatic polyunsaturation) with up to and including 18 carbon atoms; cycloalkyl, both mono- and polycyclic, with three to ten carbon atoms as in cyclopropyl, cyclohexyl, and camphyl; aralkyl with 7 to 19 carbon atoms as in benzyl and triphenylmethyl; and aromatic compounds with up to and including 18 carbon atoms as in the hydrocarbon aromatics (aryl-Ar): phenyl, naphthyl, anthryl, and benzanthryl; and as in the heterocyclic aromatics: furyl, thienyl, pyrrolyl, quinolyl, anthraquinolyl, and dibenzofuryl; as well as substituted derivatives of these alkyl, cycloalkyl, aralkyl, and aryl groups carrying one or more substituents such as hydroxy, lower alkoxy, benzyloxy, aryloxy in which the aryl groups have up to 14 carbon atoms e.g. phenyl, tolyl, naphthyl, and anthryl, lower alkyl, lower alkylsulfonyl, hydroxy lower alkylsulfonyl, benzylsulfonyl, arylsulfonyl in which the aryl groups have up to 14 carbon atoms, e.g., phenyl, tolyl, naphthyl, and anthryl, formyl, cyano, halogen, e.g., fluoro, chloro, bromo, and iodo, amino, dilower alkylamino, diphenylamino, dibenzylamino, diacylamino in which the acyl groups contain up to seven carbon atoms as in acetyl, butyroyl, and benzoyl, carboxy, lower alkoxycarbonyl, and nitro.

It should be noted that the above discussion includes only preferred groups and is far from exhaustive of the operable species. For example, the fact that it does not include diunsaturated alkyl or acetylenically unsaturated alkyl is not an indication that such groups are inoperable but simply that they are not preferred because such structures favor competing reactions in the fundamental dimerization process of this invention and cause lower yields of the desired 3-amino-2,4-bis-sulfonylcrotononitrile product.

A particularly preferred group because of their accessibility are the lower alkyl groups, hydrocarbon aromatics (aryl) of up to and including 10 carbons and substituted derivatives of these. Substituents such as nitro, halo, lower alkyl (on the aromatic group), hydroxy, amino and aryl are well known in the dyeing art to vary the properties of dyes in desirable ways. The substituted alkyl groups and aryl groups are equivalents of the hydrocarbon radical and are intended to be included within the scope of those groups.

The process of preparing 3-amino-2,4-bis-sulfonylcrotononitriles from sulfonylacetonitriles is preferably carried out under anhydrous conditions and it is convenient to employ a solvent or diluent, preferably polar, such as a lower alkanol, e.g., methanol, ethanol, butanol, ethylene glycol, glycerine, or the like, an ester, e.g., ethyl acetate or an ether, e.g., dimethyl ether, diethyl ether, tetrahydrofuran, and the like.

The base employed is preferably an alkali metal (i.e., lithium, sodium, potassium, rubidium, or cesium), an alkali metal hydroxide or an alkali metal alcoholate. The free alkali metal or the alkali metal hydroxide may be employed in dispersed form in an anhydrous ether. For example, sodium or anhydrous sodium hydroxide dispersed in tetrahydrofuran may be employed. When the solvent is an alkanol, usually a lower alkanol, addition of the alkali metal forms the corresponding alcoholate which in turn catalyzes the dimerization of the sulfonylacetonitrile. If the sulfonylacetonitrile contains any free acid function such as a carboxyl substituent as in p-carboxyphenylsulfonylacetonitrile, base is first used up in sufficient amount to convert the acid function to the salt. The base, which serves to catalyze the dimerization, is over and above any such amount used in neutralizing acidic groups. The catalyzing amount of the base must be between 0.001 and 1.0 mole per mole of sulfonylacetonitrile. If the molar ratio is not carefully controlled so that less than one mole of base is used per mole of sulfonylacetonitrile, the unchanged sulfonylacetonitrile will be recovered as shown by Tröger and Hille, J. prakt. Chem., 71, 230 (1905).

While it is not desired to be bound by speculation, it appears probable that each molecule of 3-amino-2,4-bis-sulfonylcrotononitrile is formed by condensation of one molecule of sulfonylacetonitrile with one molecule of the mono(alkali metal) derivative of the sulfonylacetonitrile and that the initial form of the product obtained is the 4-(alkali metal) - 3 - amino-2,4-bis - sulfonylcrotononitrile. Thus if sufficient alkali metal base is present to convert all of the sulfonylacetonitrile to its mono(alkali metal) derivative, i.e., 1:1 molar ratio or higher, the reaction of this invention cannot take place and only the starting material will be recovered. In the operable range employing less than one mole of base per mole of sulfonylacetonitrile, highest yields of 3-amino-2,4-bis-sulfonylcrotononitrile are obtained when 0.5 mole of base is used per mole of sulfonylacetonitrile. As illustrated in Example IV, molar ratios within the operable range but above or below the preferred 0.5:1 ratio give some product but the yields are correspondingly reduced.

The dimerization reaction may be carried out over a wide range of temperatures, and temperatures in the range from 0° C. up to the refluxing temperature of the selected reaction medium are preferred. Pressure is not a critical factor in the process. Pressures both above and below atmospheric are operable and atmospheric pressure is preferred for convenience.

It is possible to insolate the 3-amino-2,4-bis-sulfonylcrotononitrile product in the form of its 4-(alkali metal) salt

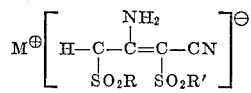

by cooling the reaction mixture below room temperature to precipitate the product which is then recovered by filtration. An alternative method of isolation is to add water to the reaction mixture. This is sufficient to cause at least partial separation of the 3-amino-2,4-bis-arylsulfonylcrotononitriles. The preferred method of isolation is to add water and then neutralize the mixture by the addition of a mineral acid, such as hydrochloric acid, sulfuric acid, nitric acid, or the like. The 3-amino-2,4-bis-sulfonylcrotononitrile is insoluble in the neutralized aqueous medium and the precipitate is isolated by filtration. The mode of isolation of the product is not a critical part of the process.

By mixed dimerization in which two different sulfonylacetonitriles in equimolar quantities are treated together with a base according to the process of this invention, 3-amino-2,4-bis-sulfonylcrotononitriles of the above formula are obtained in which the respective 2-sulfonyl and 4-sulfonyl groups (i.e., R and R') are different. Thus, when a mixture of p-tolylsulfonyl-acetonitrile and benzylsulfonylacetonitrile is treated with sodium ethylate, a mixture of 3-amino-2-benzylsulfonyl-4-p-tolylsulfonylcrotononitrile and 3-amino-4-benzylsulfonyl-2-p-tolylsulfonylcrotononitrile is obtained. These products are readily separated by fractional recrystallization.

In the following examples parts are by weight unless otherwise specified. Example I represents a preferred embodiment.

EXAMPLE I

*Part A*

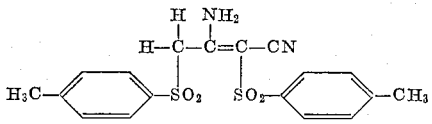

To a solution of 23 parts of sodium in 3,947 parts of ethanol at 0° C. is added 390 parts of p-tolylsulfonylacetonitrile. The mixture is then heated at reflux for 2.5 hours and allowed to stand overnight at room temperature. The solution is then diluted with 20,000 parts of water and carefully acidified by adding concentrated hydrochloric acid. 3-amino-2,4-bis(p-tolylsulfonyl)crotononitrile separates as a crystalline precipitate. This is separated by filtration and recrystallized from ethanol. The yield is 245 parts of colorless crystals melting at 194.5–195.5° C.

*Analysis.*—Calcd. for $C_{18}H_{18}N_2O_4S_2$: C, 55.38; H, 4.62; N, 7.18; S, 16.41. Found: C, 55.54; H, 4.61; N, 7.70, 7.38; S, 16.56.

*Part B*

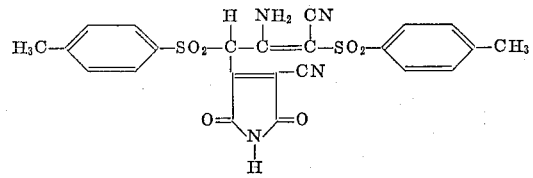

The procedure of Part A above is repeated except that after the reaction mixture is heated and allowed to stand overnight, it is evaporated to dryness to recover substantially pure 3 - amino-2,4 - bis(p - tolylsulfonyl)-4-sodiocrotononitrile. To a solution of five parts of 3-amino-2,4-bis(p-tolylsulfonyl)-4-sodiocrotononitrile in 20 parts of acetonitrile is added three parts of 2-chloro-3-cyanomaleimide. After 15 minutes at room temperature the resulting orange solution is diluted with 100 parts of water. Two parts of precipitated 2-(3-amino-2,4-bis[p-tolylsulfonyl]crotononitrile-4-yl)-3-cyanomaleimide in the form of orange crystals is collected by filtration.

*Part C*

A solution of two parts of 2-(3-amino-2,4-bis[p-tolylsulfonyl]crotononitrile-4-yl)-3-cyanomaleimide in 395 parts of ethanol is added to a solution of two parts of a sulfonated lignin dispersant in 10,000 parts of water. The resulting dye bath is heated to 100° C. Swatches of nylon and wool fabrics are added and the dye bath is agitated at 100° C. for about ½ hour. The fabrics are rinsed with water and dried. Both the nylon and the wool fabrics are dyed orange.

EXAMPLE II

*Part A*

A mixture of 2,360 parts of potassium methyl sulfinate and 1,500 parts of chloroacetonitrile in about 15,800 parts of ethanol is heated under reflux for two hours. It is then reduced to about one fourth its original volume by distilling off ethanol. The residue is cooled to precipitate methylsulfonylacetonitrile which is collected by filtration and recrystallized from ethanol. The yield of recrystallized product is 820 parts, M.P. 85–86° C.

*Part B*

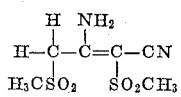

To a solution of 23 parts of sodium in 1,973 parts of ethanol is added 238 parts of methyl sulfonylacetonitrile. This solution is heated at reflux for 1.75 hours and then cooled and diluted with 2,500 parts of water. The resulting solution is carefully acidified by addition of concentrated hydrochloric acid to precipitate 3-amino-2,4-bis(methylsulfonyl)crotononitrile which is collected by filtration and dried. The yield is 125 parts. Recrystallization from water yields colorless crystals melting at 193–194.5° C. The infrared absorption spectrum shows bands characteristic of amino, cyano, and sulfone groups.

*Analysis.*—Calcd. for $(C_3H_5O_2NS)_2$: C, 30.3; H, 4.2; S, 26.9. Found: C, 30.7; H, 4.5; S, 27.4.

EXAMPLE III

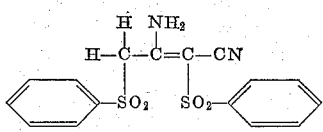

To a solution of 23 parts of sodium in 3,946 parts of ethanol is added 362 parts of benzenesulfonylacetonitrile. The solution is heated at reflux for 1.25 hours and is then cooled and diluted with 10,000 parts of water and rendered acid by adding 5% hydrochloric acid. The precipitate which forms is collected by filtration, washed with water and dried to yield 230 parts of 3-amino-2,4-bis-(phenylsulfonyl)crotononitrile. A sample recrystallized from a large volume of ethanol is in the form of colorless crystals melting at 222.5–224° C. The infrared absorption spectrum of this compound shows absorption bands characteristic of amino, sulfone, and conjugated cyano groups.

EXAMPLE IV

To a solution of 23 parts of sodium in 1,973 parts of ethanol is added 200 parts of benzenesulfonylacetonitrile. The resulting solution is heated under reflux for two hours after which it is diluted with 10,000 parts of water and acidified by adding hydrochloric acid. The precipitate which forms is collected by filtration and then heated in 5,920 parts of ethanol. This dissolves the unchanged benzenesulfonylacetonitrile starting material. The resulting mixture is filtered and the precipitate is dried to obtain about 10 parts of 3-amino-2,4-bis(phenylsulfonyl)crotononitrile melting at 218–222° C.

EXAMPLE V

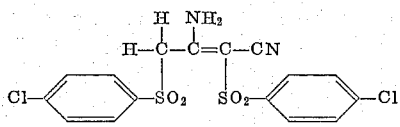

To a solution of 23 parts of sodium in 3,946 parts of ethanol is added 431 parts of p-chlorobenzenesulfonyl-acetonitrile. The resulting solution is heated under reflux for 5.5 hours and is then cooled and diluted with 20,000 parts of water. A tan precipitate separates and is collected by filtration and dried to yield 210 parts of 3-amino - 2,4 - bis(p-chlorophenylsulfonyl)crotononitrile melting at 226–227° C. The infrared absorption spectrum shows bands characteristic of amino, sulfonyl, and conjugated cyano groups.

The procedure of Example II is useful for preparing other 3-amino-2,4-bis-sulfonylcrotononitriles. For example, when the sodium or potassium salts of the sulfinic acids shown in the table below are substituted for potassium methylsulfinate in the procedure of Part A of Example II and the resulting sulfonylacetonitrile is recovered and dimerized in place of methylsulfonylacetonitrile by the action of sodium ethylate according to the procedure of Part B of Example II, the indicated 3-amino-2,4-bis-sulfonylcrotononitriles are obtained.

TABLE

| Sulfinic Acid Which is Converted to Corresponding Sulfonylacetonitrile | 3-Amino-2,4-bis(sulfonyl)crotononitrile Obtained by Action of Sodium Ethylate on the Sulfonylacetonitrile |
|---|---|
| Phenylsulfinic acid | 3-amino-2,4-bis(phenylsulfonyl)-crotononitrile. |
| o-Tolylsulfinic acid | 3-amino-2,4-bis(o-tolylsulfonyl)-crotononitrile. |
| m-Tolylsulfinic acid | 3-amino-2,4-bis(m-tolylsulfonyl)-crotononitrile. |
| α-Naphthylsulfinic acid | 3-amino-2,4-bis(α-naphthylsulfonyl)-crotononitrile. |
| β-Naphthylsulfinic acid | 3-amino-2,4-bis(α-naphthylsulfonyl)-crotononitrile. |
| Ethylsulfinic acid | 3-amino-2,4-bis(ethylsulfonyl)-crotononitrile. |
| n-Butylsulfinic acid | 3-amino-2,4-bis(n-butylsulfonyl)-crotononitrile. |
| Benzylsulfinic acid | 3-amino-2,4-bis(benzylsulfonyl)-crotononitrile. |
| Allylsulfinic acid | 3-amino-2,4-bis(allylsulfonyl)-crotononitrile. |
| Cyclohexylsulfinic acid | 3-amino-2,4-bis(cyclohexylsulfonyl)-crotononitrile |
| p-Chlorophenylsulfinic acid | 3-amino-2,4-bis(p-chlorophenylsulfonyl)-crotononitrile. |
| p-Bromophenylsulfinic acid | 3-amino-2,4-bis(p-bromophenylsulfonyl)-crotononitrile. |
| p-Fluorosylsulfinic acid | 3-amino-2,4-bis(p-fluorophenylsulfonyl)-crotononitrile. |
| p-Iodophenylsulfinic acid | 3-amino-2,4-bis(p-iodophenylsulfonyl)-crotononitrile. |
| 1-octylsulfinic acid | 3-amino-2,4-bis(1-octylsulfonyl)crotononitrile. |
| Dodecylsulfinic acid | 3-amino-2,4-bis(dodecylsulfonyl)-crotononitrile. |
| Heptylsulfinic acid | 3-amino-2,4-bis(heptylsulfonyl)-crotononitrile. |
| Octadecylsulfinic acid | 3-amino-2,4-bis(octadecylsulfonyl)-crotononitrile. |
| o-Cyanophenylsulfinic acid | 3-amino-2,4-bis(o-cyanophenylsulfonyl)-crotononitrile. |
| m-Cyanophenylsulfinic acid | 3-amino-2,4-bis(m-cyanophenylsulfonyl)-crotononitrile. |
| p-Cyanophenylsulfinic acid | 3-amino-2,4-bis(p-cyanophenylsulfonyl)-crotononitrile. |
| 2-dibenzofurylsulfinic acid | 3-amino-2,4-bis(2-dibenzofurylsulfonyl)-crotononitrile. |
| Isopentylsulfinic acid | 3-amino-2,4-bis(isopentylsulfonyl)-crotononitrile. |
| β-Chloroethylsulfinic acid | 3-amino-2,4-bis(β-chloroethyl-sulfonyl)crotononitrile. |
| β-Cyanoethylsulfinic acid | 3-amino-2,4-bis(β-cyanoethylsulfonyl)-crotononitrile. |
| β-Hydroxyethyl-sulfinic acid | 3-amino-2,4-bis(β-hydroxyethyl-sulfonyl)crotononitrile. |
| β-Methoxyethyl-sulfinic acid | 3-amino-2,4-bis(β-methoxyethyl-sulfonyl)crotononitrile. |
| β-(β-hydroxyethyl-sulfonyl)ethyl-sulfinic acid | 3-amino-2,4-bis(β-(β-hydroxyethyl-sulfonyl)ethylsulfonyl)crotononitrile. |
| o-Methoxyphenyl-sulfinic acid | 3-amino-2,4-bis(o-methoxyphenyl-sulfonyl)crotononitrile. |
| p-Methoxyphenyl-sulfinic acid | 3-amino-2,4-bis(p-methoxyphenyl-sulfonyl)crotononitrile. |
| o-Carboxyphenyl-sulfinic acid | 3-amino-2,4-bis(o-carboxyphenyl-sulfonyl)crotononitrile. |
| p-Carboxyphenyl-sulfinic acid | 3-amino-2,4-bis(p-carboxyphenyl-sulfonyl)crotononitrile. |
| o-Methoxycarbonylphenylsulfinic acid | 3-amino-2,4-bis(o-methoxycarbonyl-phenyl-sulfonyl)crotononitrile. |
| p-Methoxycarbonylphenylsulfinic acid | 3-amino-2,4-bis(p-methoxycarbonyl-phenyl-sulfonyl)crotononitrile. |
| 5-chloro-2-cyano-3-methylphenylsulfinic acid | 3-amino-2,4-bis(5-chloro-2-cyano-3-methyl-phenylsulfonyl)crotononitrile. |
| 2-cyano-5-methyl-phenylsulfinic acid | 3-amino-2,4-bis(2-cyano-5-methyl-phenyl-sulfonyl)crotononitrile. |
| 4-cyano-3-methyl-phenylsulfinic acid | 3-amino-2,4-bis(4-cyano-3-methyl-phenyl-sulfonyl)crotononitrile. |
| 2-cyano-3,5-dimethyl-phenylsulfinic acid | 3-amino-2,4-bis(2-cyano-3,5-dimethyl-phenyl sulfonyl)crotononitrile. |
| 1-cyano-2-naphthyl-sulfinic acid | 3-amino-2,4-bis(1-cyano-2-naphthyl-sulfonyl)crotononitrile. |
| 8-cyano-1-naphthyl-sulfinic acid | 3-amino-2,4-bis(8-cyano-1-naphthyl-sulfonyl)crotononitrile. |
| Ethoxycarbonyl-methyl-sulfinic acid | 3-amino-2,4-bis(ethoxycarbonyl-methyl-sulfonyl)crotononitrile. |
| β-Ethoxycarbonyl-ethyl-sulfinic acid | 3-amino-2,4-bis(β-ethoxycarbonyl-ethyl-sulfonyl)crotononitrile. |
| 4-cyanobutylsulfinic acid | 3-amino-2,4-bis(4-cyanobutyl-sulfonyl)crotononitrile. |
| 5-methoxycarbonyl-pentylsulfinic acid | 3-amino-2,4-bis(5-methoxycarbonyl-pentyl-sulfonyl)crotononitrile. |
| p-Acetylaminophenyl-sulfinic acid | 3-amino-2,4-bis(p-acetylaminophenyl-sulfonyl)crotononitrile. |
| p-Phenylsulfonyl-phenylsulfinic acid | 3-amino-2,4-bis(p-phenylsulfonyl-phenylsulfonyl)crotononitrile. |
| β-Phenoxyethyl-sulfinic acid | 3-amino-2,4-bis(β-phenoxyethyl-sulfonyl) crotononitrile. |
| 3-methoxypropyl-sulfinic acid | 3-amino-2,4-bis(3-methoxypropyl-sulfonyl) crotononitrile. |
| p-Phenoxyphenyl-sulfinic acid | 3-amino-2,4-bis(p-phenoxyphenyl-sulfonyl) crotononitrile. |
| m-Nitrophenyl-sulfinic acid | 3-amino-2,4-bis(m-nitrophenyl-sulfonyl) crotononitrile. |
| Dichloromethyl-sulfinic acid | 3-amino-2,4-bis(dichloromethyl-sulfonyl) crotononitrile. |
| Trichloromethyl-sulfinic acid | 3-amino-2,4-bis(trichloromethyl-sulfonyl) crotononitrile. |
| 1,7,7-trimethylbicyclo-[2.2.1]heptan-2-ylsulfinic acid | 3-amino-2,4-bis(1,7,7-trimethylbicyclo[2.2.1] heptan-2-ylsulfonyl)-crotononitrile. |
| 4-methyl-2,6-dinitrophenylsulfinic acid | 3-amino-2,4-bis(4-methyl-2,6-dinitrophenyl-sulfonyl)crotononitrile. |
| 2,4,6-trimethylphenylsulfinic acid | 3-amino-2,4-bis(2,4,6-trimethylphenyl-sulfonyl)crotononitrile. |
| 2-methyl-5-isopropyl-phenylsulfinic acid | 3-amino-2,4-bis(2-methyl-5-isopropyl-phenyl-sulfonyl)crotononitrile. |
| 5,6,7,8-tetrahydro-1-naphthylsulfinic acid | 3-amino-2,4-bis(5,6,7,8-tetrahydro-1-naphthyl-sulfonyl)crotononitrile. |
| 4-chloro-1-naphthyl-sulfinic acid | 3-amino-2,4-bis(4-chloro-1-naphthyl-sulfonyl) crotononitrile. |
| 1-chloro-2-naphthyl-sulfinic acid | 3-amino-2,4-bis(1-chloro-2-naphthyl-sulfonyl) crotononitrile. |
| 8-nitro-1-naphthyl-sulfinic acid | 3-amino-2,4-bis(8-nitro-1-naphthyl-sulfonyl) crotononitrile. |
| 5-nitro-1-naphthyl-sulfinic acid | 3-amino-2,4-bis(5-nitro-1-naphthyl-sulfonyl) crotononitrile. |

TABLE—Continued

| Sulfinic Acid Which is Converted to Corresponding Sulfonylacetonitrile | 3-Amino-2,4-bis(sulfonyl)crotononitrile Obtained by Action of Sodium Ethylate on the Sulfonylacetonitrile |
|---|---|
| p-Biphenylsulfinic acid. | 3-amino-2,4-bis(p-biphenylsulfonyl)-crotononitrile. |
| 2-anthrylsulfinic acid | 3-amino-2,4-bis(2-anthrylsulfonyl)-crotononitrile. |
| o-Ethoxyphenyl-sulfinic acid. | 3-amino-2,4-bis(o-ethoxyphenyl-sulfonyl) crotononitrile. |
| 2-methoxy-5-methylphenylsulfinic acid. | 3-amino-2,4-bis(2-methoxy-5-methyl-phenylsulfonyl)crotononitrile. |
| 4-methoxy-2,6-dimethylphenylsulfinic acid. | 3-amino-2,4-bis(4-methoxy-2,6-dimethylphenylsulfonyl)crotononitrile. |
| 4-bromo-3-formylphenylsulfinic acid. | 3-amino-2,4-bis(4-bromo-3-formylphenylsulfonyl)crotononitrile. |
| 4-bromo-3-carboxyphenylsulfinic acid. | 3-amino-2,4-bis(4-bromo-3-carboxyphenylsulfonyl)crotononitrile. |
| 4-chloro-2-nitro-phenylsulfinic acid. | 3-amino-2,4-bis(4-chloro-2-nitrophenylsulfonyl)crotononitrile. |
| Triphenylmethylsulfinic acid. | 3-amino-2,4-bis(triphenylmethylsulfonyl)crotononitrile. |
| 5-hydroxy-1-naphthylsulfinic acid. | 3-amino-2,4-bis(5-hydroxy-1-naphthyl-sulfonyl)crotononitrile. |
| 6-hydroxy-2-naphthylsulfinic acid. | 3-amino-2,4-bis(6-hydroxy-2-naphthylsulfonyl)crotononitrile. |
| 1-anthraquinonylsulfinic acid. | 3-amino-2,4-bis(1-anthraquinonylsulfonyl) crotononitrile. |
| 2-anthraquinonylsulfinic acid. | 3-amino-2,4-bis(3-anthraquinonylsulfonyl) crotononitrile. |
| 7-chloro-2-anthraquinonylsulfinic acid. | 3-amino-2,4-bis(7-chloro-2-anthraquinonyl-sulfonyl)crotononitrile. |
| 4-hydroxyl-1-anthraquinonylsulfinic acid. | 3-amino-2,4-bis(4-hydroxy-1-anthraquinonyl-sulfonyl)crotononitrile. |
| 2-ethoxy-4,5-dimethoxyphenylsulfinic acid. | 3-amino-2,4-bis(2-ethoxy-4,5-dimethoxyphenylsulfonyl)crotononitrile. |
| 3-carboxy-4-hydroxyphenylsulfinic acid. | 3-amino-2,4-bis(3-carboxy-4-hydroxyphenyl-sulfonyl)crotononitrile. |
| 2-furylsulfinic acid | 3-amino-2,4-bis(2-furylsulfonyl)-crotononitrile. |
| 2-thienylsulfinic acid | 3-amino-2,4-bis(2-thienylsulfonyl)-crotononitrile. |
| 2-pyrrolylsulfinic acid | 3-amino-2,4-bis(2-pyrrolylsulfonyl)-crotononitrile. |
| o-Aminophenylsulfinic acid. | 3-amino-2,4-bis(o-aminophenylsulfonyl)crotononitrile. |
| m-Aminophenylsulfinic acid. | 3-amino-2,4-bis(m-aminophenylsulfonyl)crotononitrile. |
| p-Dimethylaminophenylsulfinic acid. | 3-amino-2,4-bis(p-dimethylaminophenylsulfonyl)crotononitrile. |

As indicated above, mixtures of any two of the sulfonylacetonitriles obtainable by reaction of chloroacetonitrile with the sulfinic acids shown in the table may be codimerized to give the corresponding 3-amino-2,4-bis-sulfonylcrotononitriles in which the two sulfonyl groups carry different radicals.

All of the 3-amino-2,4-bis-sulfonylcrotononitriles shown above are converted to their 4-sodio derivatives by the action of sodium. These sodio derivatives react readily with 2-chloro-3-cyanomaleimide according to the procedure of Part B of Example I to yield the corresponding dyes.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Compounds of the formula

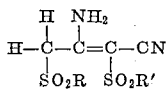

wherein R and R' are monovalent radicals of up to and including 18 carbon atoms attached to the sulfone by a bond stemming from a carbon atom.

2. Compounds of the formula

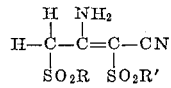

wherein R and R' are members of the class consisting of lower alkyl, aryl of up to and including 10 carbons and substituted derivatives thereof, said derivatives carrying at least one substituent selected from the group consisting of hydroxy, lower alkoxy, benzyloxy, aryloxy in which the aryl groups have up to 14 carbon atoms, lower alkyl, lower alkylsulfonyl, hydroxy lower alkylsulfonyl, benzylsulfonyl, arylsulfonyl in which the aryl groups have up to 14 carbon atoms, formyl, cyano, halogen, amino, dilower alkylamino, diphenylamino, dibenzylamino, diacylamino in which the acyl groups have up to seven carbon atoms, carboxy, lower alkoxycarbonyl, and nitro.

3. Compounds of the formula

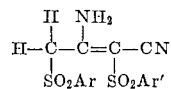

wherein Ar and Ar' are aryl radicals of up to and including 10 carbons.

4. 3-amino-2,4-bis(p-tolylsulfonyl)-crotononitrile.
5. 3-amino-2,4-bis(methylsulfonyl)-crotononitrile.
6. 3-amino-2,4-bis(phenylsulfonyl)-crotononitrile.
7. 3-amino-2,4-bis(p-chlorophenylsulfonyl)-crotononitrile.

8. Process for the preparation of 3-amino-2,4-bis-sulfonylcrotononitriles of claim 1 which comprises treating a sulfonylacetonitrile with a base in an amount between 0.001 and 1.0 mole of base per mole of sulfonylacetonitrile, said base being selected from the group consisting of alkali metals, alkali metal hydroxides, and alkali metal alkoxides, acidifying the resultant mixture and isolating the resulting disulfonyl compound.

9. Process for the formation of compounds of the formula

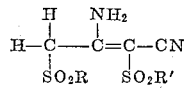

wherein R and R' are radicals of up to and including 18 carbon atoms attached to the sulfone by a bond stemming from a carbon atom, which comprises treating at least one sulfonylacetonitrile of the class consisting of those of the formula $RSO_2CH_2CN$ and of the formula $R'SO_2CH_2CN$, wherein R and R' are defined as above, with a base in an amount between 0.001 and 1.0 mole of base per mole of sulfonylacetonitrile, said base being selected from the group consisting of alkali metals, alkali metal hydroxides and alkali metal alkoxides, acidifying the resultant mixture and isolating the resulting disulfonyl compound.

References Cited in the file of this patent
UNITED STATES PATENTS 2,900,283    McGahen _____ Aug. 18, 1959
3,013,013    Carboni _____ Dec. 12, 1961